United States Patent [19]

Reinsch et al.

[11] Patent Number: 5,179,425

[45] Date of Patent: Jan. 12, 1993

[54] HAND HELD PAINT INSPECTION METER

[75] Inventors: Stephen J. Reinsch, Vista; Joseph M. Haggerty, Carlsbad, both of Calif.

[73] Assignee: Hughes Aircraft Company, Los Angeles, Calif.

[21] Appl. No.: 741,383

[22] Filed: Aug. 7, 1991

[51] Int. Cl.⁵ .............................................. G01B 11/30
[52] U.S. Cl. ..................................... 356/371; 356/237; 356/446
[58] Field of Search ................. 356/371, 237, 445, 446

[56]  References Cited

U.S. PATENT DOCUMENTS

| | | | |
|---|---|---|---|
| 4,019,066 | 4/1977 | Lucas et al. | 356/371 |
| 4,629,319 | 12/1986 | Clarke et al. | 356/237 |
| 4,989,984 | 2/1991 | Salinger | 356/445 |

FOREIGN PATENT DOCUMENTS

| | | | |
|---|---|---|---|
| 191010 | 8/1988 | Japan | 356/371 |
| 297503 | 11/1989 | Japan | 356/237 |

WO87/00629  1/1987  World Int. Prop. O. .......... 356/237

Primary Examiner—F. L. Evans
Attorney, Agent, or Firm—Terje Gudmestad; Wanda K. Denson-Low

[57]  ABSTRACT

A hand held instrument for measuring roughness of a surface, such as the "orange peel" on a painted surface, employs a scanning disc (42) which mounts a light source (56) to project a light beam at the surface being measured in a circular scan pattern. Light reflected from the surface is received by a sensor (90) which produces an output electrical signal having an amplitude and frequency that follow the amplitude and frequency of reflected light received by the sensor. Electrical signals representing amplitude and frequency are suitably combined (134) to provide an output display (114) that reads the value of orange peel according to a set of values determined by calibration of the instrument from a set of calibration panels.

15 Claims, 3 Drawing Sheets

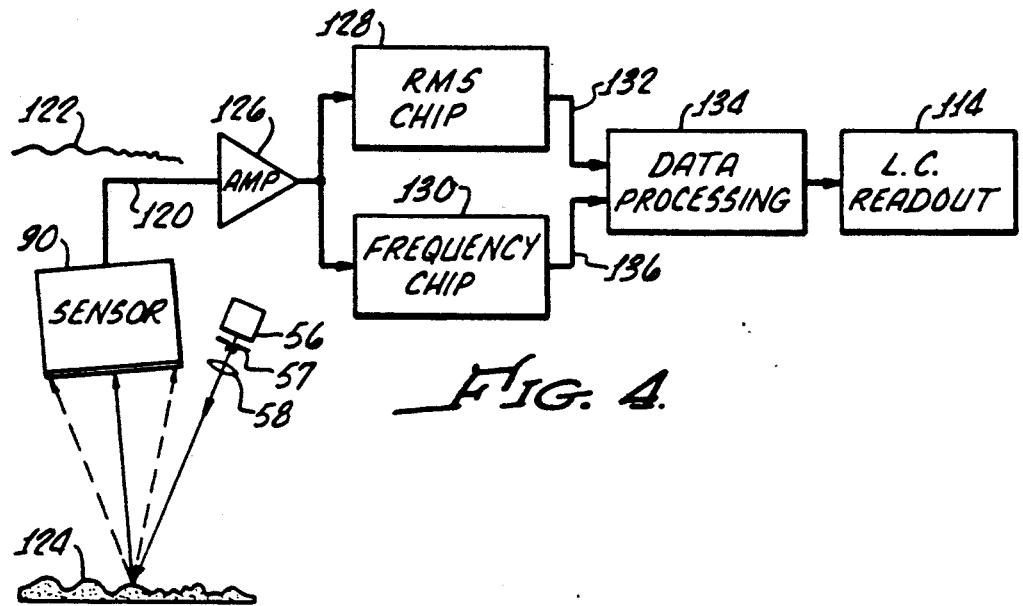
Fig. 4.
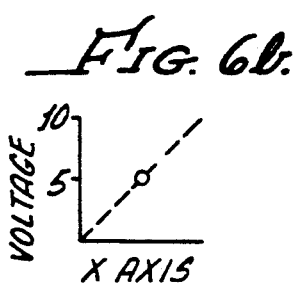 
Fig. 6a.   Fig. 6b.   Fig. 6c.
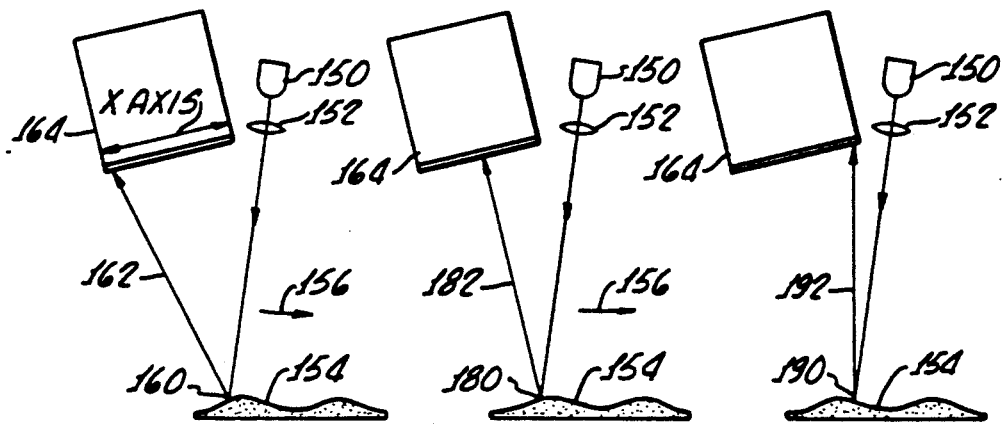
Fig. 5a.   Fig. 5b.   Fig. 5c.

HAND HELD PAINT INSPECTION METER

BACKGROUND OF THE INVENTION

1. Field of the Invention

The present invention relates to inspection of surface characteristics of an object and more particularly concerns making spot checks for determining surface roughness conditions such as the so-called "orange peel" condition of a painted surface.

2. Description of Related Art

The present invention is applicable to measurement, analysis and inspection of surface roughness of many types of objects, but has been specifically designed and initially operated for measurement of the so-called "orange peel" effect of a painted surface. This effect is caused by small, closely spaced wrinkles of the paint surface. It is a measure of how smooth the top surface of the paint appears. Orange peel effect is presently measured subjectively by eye. Prior meters, although capable of measurement of some parameters of paint quality, are unable to directly measure orange peel as an independent parameter.

Applicant is unaware of any prior devices that directly measure orange peel. However, measurement of orange peel is important in the painting of automobiles because it is a major cause of poor paint jobs. Orange peel at present is quantified by subjective judgment, that is, by an individual personal observation of the surface. Orange peel is caused by various parameters of the paint process itself, including humidity, temperature and amount of solvent in the paint. If there were available an objective quantitative measure of orange peel, it would be possible to relate such measure to process parameters so that the process could be corrected to decrease the adverse orange peel effect. Such analysis and process control could not be accomplished prior to the present invention.

In some situations, such as the painting of large electrical appliances or computer housings, for example, it is desirable to obtain some degree of orange peel on the final paint surface. Nevertheless, there still is lacking any way to quantify the amount of intended surface roughness for quality control.

Paint inspection meters of the prior art have measured other parameters of paint quality such as gloss, color purity, and distinctness of image. The latter is defined as the distinctness of an image reflected from the painted surface. However, none of these prior devices can directly measure orange peel as an independent parameter. Further, prior paint inspection meters are neither small nor easy to handle. Prior art devices require two hands and, although they may be portable, are not readily transported and used by a single hand. Prior meters are often subjective in use so that different operators will obtain different results. Such prior measuring devices also require longer periods of time to make a measurement or may require cable attachment to power supplies and other stationary circuitry.

Accordingly, it is an object of the present invention to provide for surface inspection that avoids or minimizes abovementioned problems.

SUMMARY OF THE INVENTION

In carrying out principles of the present invention, in accordance with a preferred embodiment thereof, an optical beam is scanned across an area of a surface of which roughness is to be measured and light reflected from the surface is received as the beam scans. A varying electrical signal is generated representing light that is received from the surface, and amplitude and frequency of the varying electrical signal are employed to provide an output indicative of surface roughness.

BRIEF DESCRIPTION OF THE DRAWINGS

In the accompanying drawings:

FIG. 4 is a block diagram of circuitry of the apparatus, schematically illustrating the projection and reflection of light;

FIGS. 5a, 5b and 5c schematically illustrate different positions of an alternate embodiment employing a position sensor;

FIGS. 6a, 6b and 6c graphically depict how the output of a position sensor varies with the point of impingement of received light;

DESCRIPTION OF THE PREFERRED EMBODIMENTS

Figure 1:
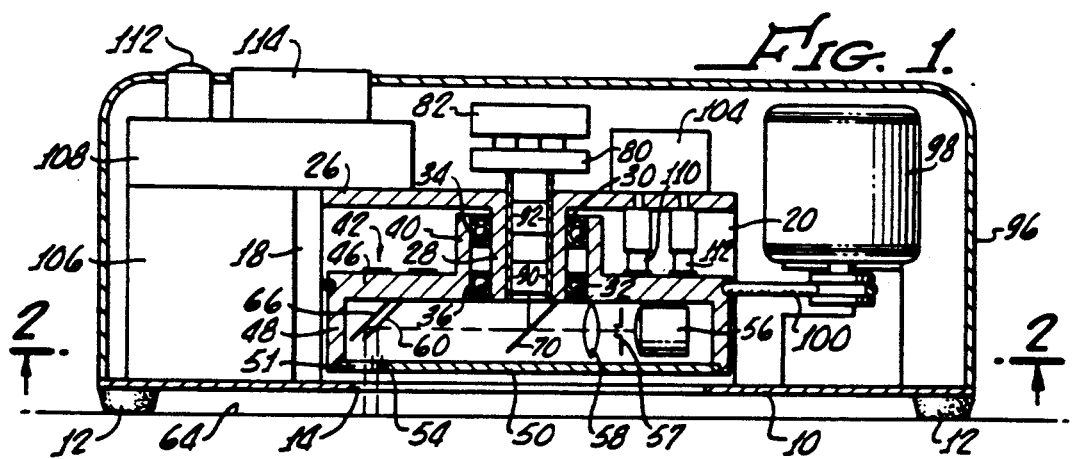
FIG. 1 is a sectional elevation view of an apparatus embodying principles of the present invention.

Referring to FIGS. 1–3 and 7, a rigid base plate 10 having firm rubber feet 12 on a bottom thereof is provided with an aperture 14 and fixedly carries a plurality of support posts 18,20. Mounted on the fixed support posts 18,20 is a fixed supporting plate 26 which spans the posts and includes a rigid depending hollow sleeve 28 formed at an intermediate portion thereof. The exterior of sleeve 28 carries sets of fixed circular bearing races 30,32 which rotatably cooperate with rotating bearing races 34,36 carried on the inner surface of a central hub 40 of a rotor in the form of a cup-shaped disc 42. Thus the bearings 30,32,34 and 36 provide a journal for the disc and hub and also fixedly locate the disc in an axial position to prevent axial motion of the disc and its hub along the fixed sleeve 28.

Figure 2:
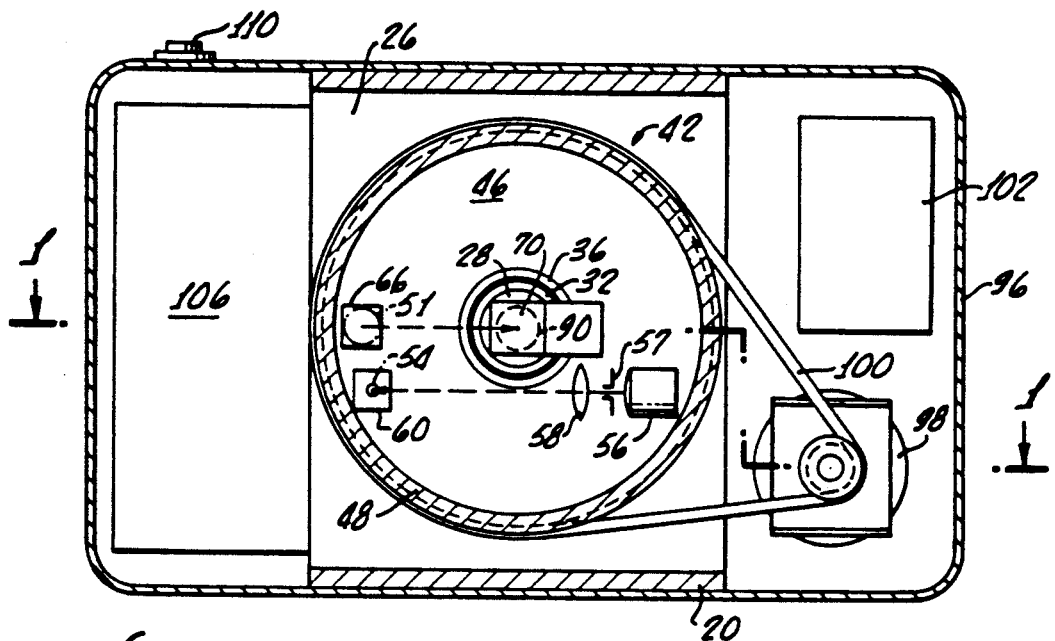
FIG. 2 is a plan view of structure within the apparatus housing.
Figure 3:
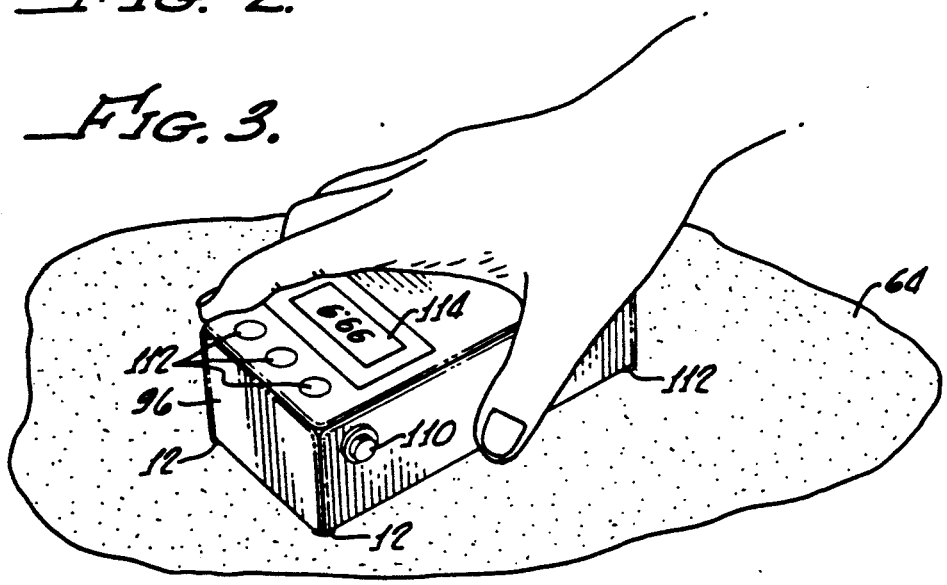
FIG. 3 is a perspective view of the overall hand held device.
Figure 7:
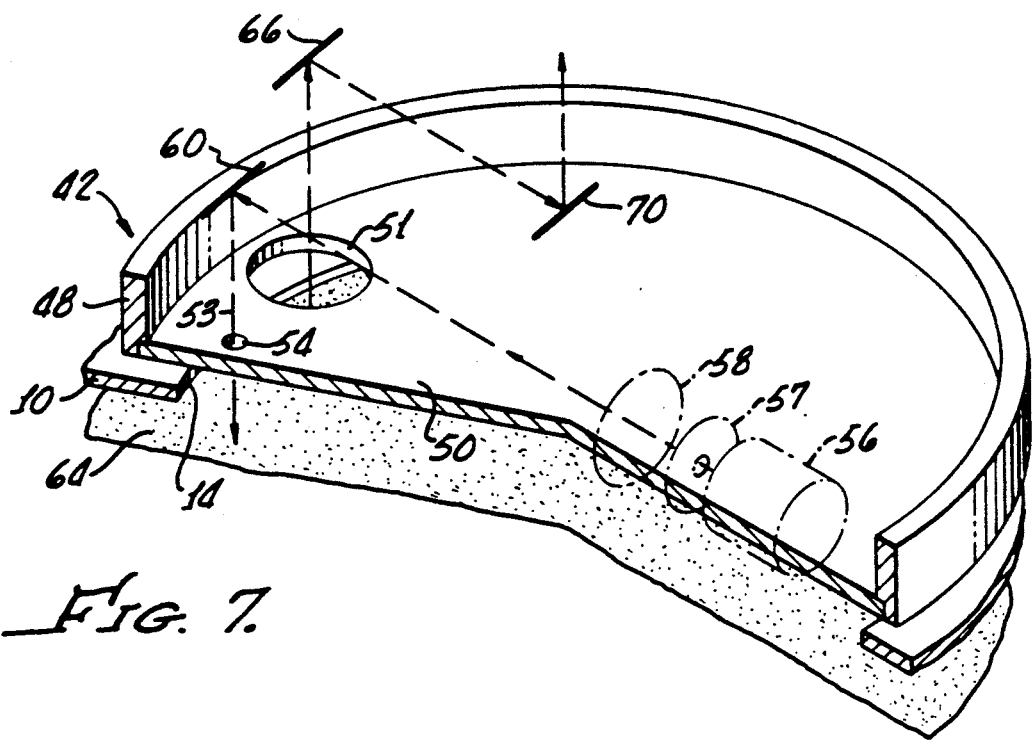
FIG. 7 is a fragmentary pictorial view of part of the rotating disc.

Disc 42 includes a central or web portion 46, a depending circumferential flange 48 and a bottom closure plate 50 which has two side by side openings 51,54 (FIGS. 2,7). The larger one of these openings (51) is used to receive light reflected from a surface being measured. The other (54) is provided for controlling size of an exiting light beam. Fixedly mounted on a lower side of web 46 is a light source, such as a light emitting diode 56, which is arranged to send light through aperture an 57 and a lens 58, also mounted on the web, to a first reflecting mirror 60 at a location spaced across the disc from the light source so that light from the diode is focused by the lens 58 and reflected downwardly by a projecting mirror 60. Light from the mirror is transmitted through aperture 54 of the disc plate 50 and through the aperture 14 of the fixed bottom plate 10 to impinge upon a surface 64 of which roughness is to be measured. Elements 56, 57, 58, all mounted to web 46 above plate 50, are shown in phantom lines in FIG. 7. The bottom plate aperture 14 is aligned with the rotating disc and has a diameter substantially equal to the disc diameter. Light reflected from surface 64 passes through the housing plate aperture 14, back through the second or light receiving disc plate opening 51 adjacent the disc plate aperture 54 to a second reflecting mirror 66 positioned adjacent to but spaced from the outgoing or projecting reflecting mirror 60. Light received by mirror 66 is reflected to a third reflecting mirror 70 positioned to redirect light from mirror 66 axially upwardly through the hollow sleeve 28. Components 56, 58, 60, 66, and 70 are all fixed to and rotate with disc 42.

A circuit board 80 carrying electronics indicated at 82 is fixedly connected to a depending tube 84 that is snugly received in and fixedly but detachably connected to the interior of mounting plate sleeve 28. Fixedly mounted within the tube 84 is a sensor, such as a photo transistor 90, and suitable amplifying circuitry 92 therefor.

A cover 96 forms a housing enclosure that encloses the mechanism described above and provides a space within the housing for mounting a motor 98 that is connected to rotatably drive the disc 42 by means of a belt 100. A suitable alternative drive may comprise a friction drive having a motor driven disc carrying a circumferential O-ring that frictionally engages the rotating disc. Also mounted on the base plate 10 are a motor drive battery 102 (FIG. 2) and an electronics power supply battery 104 which is connected to supply power to the electronics within the housing. This electronics includes a circuit board 106 having suitable circuitry 108, to be described below, mounted thereon. Brushes in the form of flat springs 110,112 on the lower surface of the support plate 26 are connected to the fixed electronics power supply 104 (FIG. 1) to provide power to the rotating light source 56. Also mounted on the cover housing 96 are a start button 110 (FIGS. 1 and 2), suitable indicating lights 112 to indicate status of the apparatus, and a display, such as a liquid crystal display 114, that provides a visual numerical output of the apparatus.

For use of the device it is merely placed directly against the surface of which orange peel to be measured so that the entire apparatus may rest, via its hard rubber feet 12, directly on the surface to be measured. In operation of the embodiment illustrated in FIG. 1, upon actuation of start button 110 the motor is energized to start rotation of disc 42 and the light emitting diode 56 is energized. A beam of light is fed through the lens 58 to mirror 60 from whence it is reflected downwardly to the surface 64 that is under the housing of the apparatus.

The light beam traverses the surface 64 in a circular scanning path as the disc rotates to thereby illuminate successive areas of the surface along the circular path of travel of the projected light beam. Light reflected from successive illuminated areas of surface 64 is received by mirror 66 and returned to mirror 70, which in turn re-directs the light to the sensing photo transistor 90. Because of the roughness of the surface the amplitude and direction of the reflected light will vary. Therefore overall intensity of reflected light received by the photo transistor will vary in accordance with the nature of the variation of the surface roughness.

When utilizing a photo transistor as sensor, the sensor effectively integrates the light received and puts out an electrical output signal on a line 120 (FIG. 4). The signal has a fluctuating configuration, as indicated at 122, that roughly matches the fluctuating elevation of the orange peel surface 124, as illustrated in FIG. 4. Note that FIG. 4 illustrates a short section, extending from left to right in this figure, of the painted surface which section actually extends along the circular scanning path of the projected light beam. The output signal on line 120 from the photosensitive transistor is fed to an amplifier 126 and thence, in parallel, as an AC input to each of an amplitude analyzing chip 128 and a frequency averaging chip 130. The amplitude chip 128 may be an integrated circuit, such as a RMS-to-DC converter Model AD536A manufactured by Analog Devices. This chip computes the true root mean square level of the AC input signal and provides an equivalent DC output level. The output of RMS chip 128 effectively averages the RMS of all of the signal variations of signal 122 over one single complete revolution of the scanning light beam. In a typical measurement, the disc and scanning beam will rotate up to thirty times, and the average of the RMS value of all of the thirty revolutions collectively is effectively provided by the integrated circuit 128 to provide an RMS output on an output line 132 that is fed as a first input to a data processing circuit 134.

In a like manner frequency chip 130 provides a DC output, on a line 136, having a magnitude that is the average of the frequency over all the revolutions of a measurement of its input from amplifier 126. Although many different types of frequency chips may be employed, it is presently preferred to employ a frequency-to-voltage converter integrated circuit, such as Model 451 or 453 of Analog Devices. The integrated circuit 130 accepts the input signal from amplifier 126 and provides an accurate conversion into an output voltage on its output line 136, having an amplitude that is proportional to the input signal frequency. This is the average frequency over a single scanning revolution. This average frequency is itself averaged for the number of complete scanning revolutions (such as 30 for example) to provide a DC frequency-indicating signal on line 136 as a second input to circuit 134. The amplitude and frequency signals on lines 132 and 136 are combined in the data processing circuit 134 to provide an output to the liquid crystal numerical readout 114.

Although various types of data processing may be employed, it is presently preferred to provide a simple summation of the two signals, weighted toward the amplitude signal, by additively combining the DC amplitude and frequency signals in a 2:1 ratio, that is, twice the value of the amplitude signal is added to a unitary value of the frequency signal.

The two DC voltages, the DC amplitude and the DC frequency voltage, represent surface characteristics of the reflecting surface 124. They can be read separately if deemed necessary or desirable to provide information concerning characteristics of the surface under observation, but for a more accurate determination of the magnitude of the orange peel effect, the above described combination of the two is preferred.

The amplitude (intensity) of the reflected light correlates with reflective characteristics of the surface being measured, providing an indication of surface angle or inclination at successive areas along the same path, while frequency of the intensity variations correlates with the spacing or density of the surface roughness features. Stated otherwise, the magnitude of amplitude variation of received reflected light corresponds to the height of the bumps or wrinkles on the surface being inspected. The frequency of intensity variation of received reflected light corresponds to distance between bumps or wrinkles.

It will be understood that the rotational speed of the disc is fixed and regulated so that frequency measurements will be consistent. So too, all of the voltages are regulated so that they will be steady and not drift as battery voltages drop.

The apparatus, after being placed on a surface to be measured with its legs 12 directly on the surface, is started by pushing button 110. When the motor is up to speed the logic circuitry begins to collect data for a short time. Data collection is stopped and the motor is then shut off and allowed to slow down, all so that the collection of data can be obtained only while the disc is operating at a fixed rotational speed.

Test or calibration panels having predetermined amounts of surface roughness or orange peel are employed for calibration. Such test panels are subjectively analyzed and graded by an individuals eye, one who is considered to be expert in such subjective analysis. The several test panels, each with a different degree and amount of orange peel, are given orange peel numbers between 1 and 10, in the normal mode of subjective quantitative measurement of orange peel. The described apparatus is then placed on a first one of the test panels, and measurements are made as described above. Circuitry of the apparatus, including adjustable potentiometers (not shown) are adjusted so that for calibration panel 1 for example, the liquid crystal display of the apparatus will read 1. So too for each of the other calibration panels, the circuitry of the apparatus is adjusted so as to read the specific number of the particular test calibration panel that is being measured at the particular time (e.g. 2 for panel 2, 3 for panel 3, etc.). Thus the circuitry of the apparatus is calibrated according to the calibration panels. Thereafter, when placed on a surface of unknown orange peel the instrument will provide an output in the form of an orange peel number from to 10 that properly indicates the amount of the orange peel. The orange peel reading of the instrument is without any subjective input from the operator other than what is necessary to grade the test calibration panels themselves.

The apparatus uses very little power since most of the power is consumed in the very short time that the device actually takes data. The apparatus is turned on to rotate the disc only momentarily when the button is depressed. After making a measurement at a particular point on a surface, the apparatus is carried or moved to a new sample point, and of course no power is consumed during this transfer. The several indicator lights 112 may be color coded or otherwise identified so as to display to the user the status of the device, that is, "ready", "taking data", or "measurement completed".

The optical path length of light from the LED 56 to the surface and back to the sensor 90 may be in the order of about four inches, which is long enough so that the relatively small amount of deflection of the elastomeric legs 12 will not significantly change the optical path and disturb focus of the beam. The light beam may be collimated so as to avoid a defocusing problem if the path length should change by a small amount. However, in the illustrated system the light rays from source 56 diverge to aperture 52 and thence to the surface being evaluated.

In an alternative arrangement, as illustrated schematically in FIGS. 5 and 6, the photosensitive transistor sensor 90 is replaced by a position sensor, such as an EG and G, Sitek 2LO10 Position Sensing Detector, which may be used with a Model 301DIV amplifier module made by Sitek Company. This sensor provides an output signal having a magnitude depending on the position of the received light on the sensor surface. For example, as indicated in FIG. 5a, a light beam from a light-source 150, which may be a diode laser, is fed through a lens 152 (and suitable reflectors, not shown) to the surface 154 that is to be tested. Surface 154 is illustrated as having an orange peel. The light source sensor and projected beams (mounted as described in connection with FIGS. 1-3) are moving in a scanning path, as illustrated in FIG. 5a, in the direction of arrow 156. With the projected light beam impinging upon a surface area 160 of the surface 154, which is sloping downwardly and toward the left as viewed in FIG. 5a, light reflected along path 162 is received at a leftmost portion of position sensor 164. The sensor has an orientation with an X axis, as indicated in FIG. 5a.

FIG. 6a is a plot of output voltage against X axis position of received light for the position sensor 164. This figure illustrates the fact that a relatively low voltage (near zero), point 170, is provided at the output of the position sensor when light is received near one end of the X axis of the device.

FIG. 5b shows a slightly different position along the direction of motion of the laser 150 and sensor 164 where the light impinges upon an area 180 of the surface 154 that is at a different angle, causing the reflection to be directed along line 182 to a mid-point 184 along the X axis of the position sensor. With this position of received light the sensor output voltage, as illustrated in FIG. 6b, is significantly higher, in the order of 5 volts. Similarly, with further travel of the disc with its diode 150 and position sensor 164, the outgoing beam will impinge upon an area 190 of surface 154 to reflect light along path 192 to a point 196 near the right side of sensor 164. When light is received near the right side of the sensor the output voltage may be as much as 10 volts, as indicated in FIG. 6c. Thus the magnitude of the voltage output of the position sensor 164 varies with the position of reception of the reflected light. Fluctuation of this output voltage amplitude will effectively follow the fluctuation of the height of the orange peel surface. The same RMS frequency chips as are employed with the photo transistor sensor of FIG. 4 may be employed with the position sensor of FIG. 5 with suitable adjustment of the circuitry. Preferably, the position sensor is employed with a laser diode that produces a pencil beam of about twenty thousandths of an inch in diameter. In using a light emitting diode or other light source the projected light is slightly spread and collimated and provides an area of impingement, e.g. a footprint upon the surface being measured, in the order of about a quarter of an inch in diameter. The combination of light emitting diode as a light source and photo transistor as a sensor is preferred because such an apparatus is cheaper and simpler. Suitable pinhole arrangements may be employed with the sensors and light projecting devices to properly form the projected and received light beams.

The disc 42 may be in the order of one to six inches in diameter depending upon the area of the surface that is to be observed. If surface roughness of an are varies significantly from point to point a larger disc may be preferred to average more variations. Discs of as much as six inches or even larger may be employed. If the surface is reasonably uniform in its roughness, a smaller disc may be used.

Figure 8:
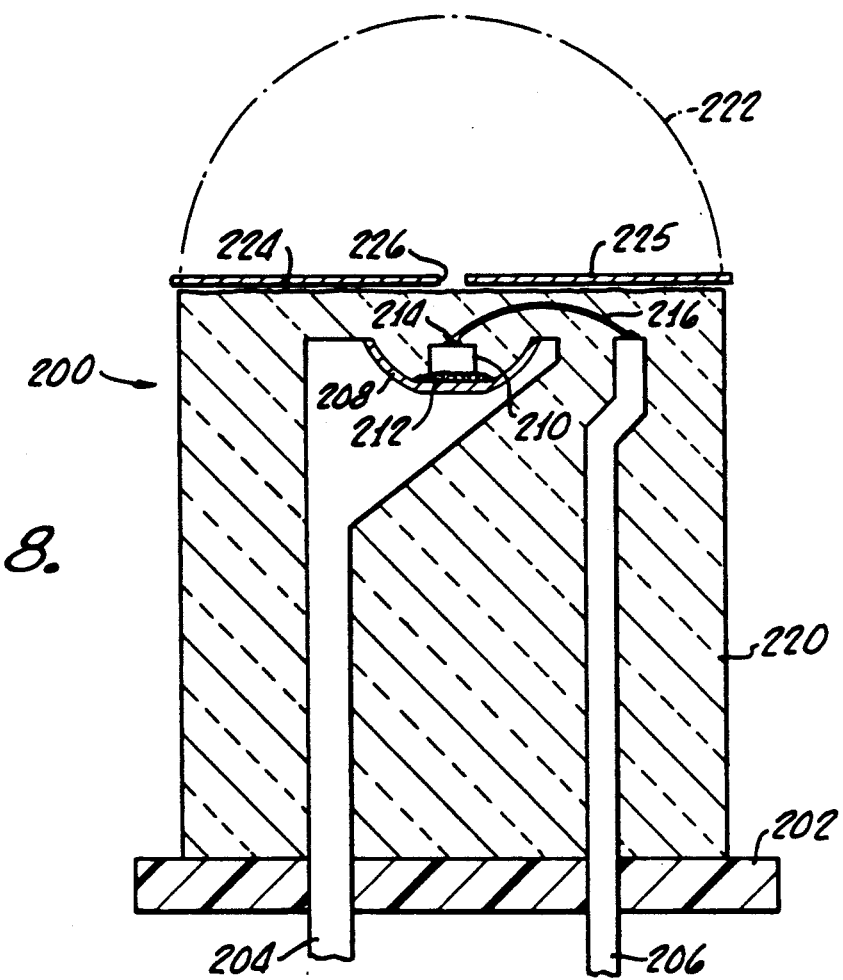
FIG. 8 illustrates a modified point light source.

A point light source of the type described in my co-pending U.S. patent application for Optical Monitoring Apparatus, Ser. No. 741,851, Filed Aug. 7, 1991 is presently preferred because of its simplicity and low cost. The disclosure of this co-pending application is incorporated herein by this reference as though fully set forth. Such a simplified point light source is illustrated in greatly enlarged form in FIG. 8, and is described in complete detail in my co-pending application. The improved light source of the co-pending application comprises a modified light emitting diode, generally indicated at 200. A conventional diode includes a base 202, having leads 204,206 one of which supports a cup-shaped reflector 208, upon which is mounted a light emitting chip 210 on a suitable adhesive base 212. From an electrical contact 214 on the face of the chip a fine wire lead 216 connects the chip to the second lead 206. The diode is conventionally encapsulated in a solid transparent plastic body 220 which originally is provided with a partly spherical lens type end portion 222. To provide the improved point light source of my co-pending application the partly spherical lens portion 222 is removed along a flat surface 224, which is then roughened, as with an abrasive, to provide a diffusing light exiting surface 224 from the chip. A thin opaque plastic plate 225 is then bonded to the roughened surface. Plate 225 has a small aperture 226 which is significantly smaller than the size of the chip itself, thereby providing a small point light source, the size of which is defined by the size of the aperture 226. A suitable lens (not shown in FIG. 8) provides a controlled divergence of the exiting point source light beam, which is not focused, all as described in further detail in the above identified co-pending application.

There have been described methods and apparatus for providing a rapid, simple, objective measurement of surface roughness in a simple hand-held apparatus capable of making an objective spot check of a small area of a surface without the need for complex measurement of other parameters.

In order to increase the total area scanned by the rotating light beam during a measurement, the entire rotating disc assembly may be mounted for movement on fixed rails extending parallel to the plane of the disc, with a separate motor provided to drive the disc assembly along the rails. Thus, when a measurement is made and the disc rotates, the disc is also translated in a linear path of about one quarter to one half inch in length (perpendicular to the disc rotation axis) so that each successive circular scan of the beam traverses a different circular path of the surface being measured.

What is claimed is:

1. A method of measuring roughness of a surface comprising the steps of:
    scanning an optical beam across an area of said surface,
    receiving light reflected from said surface as said beam scans,
    generating a varying electrical signal representing varying intensity of received reflected light, and
    providing an output indicative of amplitude and frequency of said varying electrical signal,
    generating a frequency signal representing frequency of intensity variations of said varying electrical signal,
    generating an amplitude signal representing amplitude of said varying electrical signal, and
    combining said frequency and amplitude signals to provide said output,
    said frequency and amplitude signals being combined in a predetermined ratio.

2. A method of measuring roughness of a surface comprising the steps of:
    scanning an optical beam across an area of said surface,
    receiving light reflected from said surface as said beam scans,
    generating a varying electrical signal representing varying intensity of received reflected light, and
    providing an output indicative of amplitude and frequency of said varying electrical signal
    generating a frequency signal representing frequency of intensity variations of said varying electrical signal,
    generating an amplitude signal representing amplitude of said varying electrical signal,
    and combining said frequency and amplitude signals to provide said output,
    said frequency and amplitude signals being combined in a predetermined ratio,
    said ratio being weighted more heavily in favor of said amplitude signal.

3. A method of measuring roughness of a surface comprising the steps of:
    scanning an optical beam across an area of said surface,
    receiving light reflected from said surface as said beam scans,
    generating a varying electrical signal representing varying intensity of received reflected light, and
    providing an output indicative of amplitude and frequency of said varying electrical signal,
    said step of scanning comprising projecting a light beam in a direction generally perpendicular to said surface and rotating said beam about an axis parallel to said direction.

4. A method of measuring roughness of a surface comprising the steps of:
    scanning an optical beam across an area of said surface,
    receiving light reflected from said surface as said beam scans,
    generating a varying electrical signal representing varying intensity of received reflected light, and
    providing an output indicative of amplitude and frequency of said varying electrical signal,
    said step of scanning an optical beam comprising mounting a light source for rotation about a rotation axis, projecting said beam along points spaced from said axis in directions parallel to said axis to produce a circular scan of said beam.

5. A hand-held surface roughness measurement instrument comprising:
    a housing configured and arranged to be temporarily placed at a surface of which roughness is to be measured,
    scanning means in the housing for projecting an energy beam from the housing to said surface of which roughness is to be measured so as to cause energy of said beam to be reflected back into said housing,
    detector means mounted in the housing for receiving energy reflected from said surface and generating an output electrical signal of varying amplitude and frequency,
    means responsive to said electrical signal for generating amplitude and frequency signals respectively indicative of amplitude and frequency of said varying electrical signal, and means responsive to said amplitude and frequency signals for combining said amplitude and frequency signals in a predetermined ratio and providing an indication of roughness of the surface to be measured.

6. A hand-held surface roughness measurement instrument comprising:

a housing configured and arranged to be temporarily placed at a surface of which roughness is to be measured, scanning means in the housing for projecting an energy beam from the housing to said surface of which roughness is to be measured so as to cause energy of said beam to be reflected back into said housing, detector means mounted in the housing for receiving energy reflected from said surface and generating an output electrical signal of varying amplitude and frequency, means responsive to said electrical signal for generating amplitude and frequency signals respectively indicative of amplitude and frequency of said varying electrical signal, and means responsive to said amplitude and frequency signals for providing an indication of roughness of the surface to be measured, said scanning means comprising a rotor journalled in said housing and a light source carried by said rotor for projecting said energy beam as a light beam from said housing to said surface in a circular scan path.

7. A hand-held surface roughness measurement instrument comprising:

a housing configured and arranged to be temporarily placed at a surface of which roughness is to be measured, scanning means in the housing for projecting an energy beam from the housing to said surface of which roughness is to be measured so as to cause energy of said beam to be reflected back into said housing, detector means mounted in the housing for receiving energy reflected from said surface and generating an output electrical signal of varying amplitude and frequency, means responsive to said electrical signal for generating amplitude and frequency signals respectively indicative of amplitude and frequency of said varying electrical signal, and means responsive to said amplitude and frequency signals for providing an indication of roughness of the surface to be measured, said scanning means comprising a support fixed to said housing and having an axially extending sleeve, an optical detector mounted within said sleeve, a disc having a hub mounted to said sleeve for rotation about the axis of said sleeve, said housing having a bottom adapted to be positioned closely adjacent the surface of which roughness is to be measured, optical means mounted on said disc for projecting an optical beam downwardly through the bottom of said housing, and reflective means on said disc for reflecting light received from said surface to said detector in said sleeve.

8. Apparatus for scanning the surface of an object comprising:

a support, means for mounting the support for rotation about a rotation axis, means for rotatably driving the support, means carried by the support for projecting an energy beam parallel to said axis in a scan pattern, whereby areas on a surface positioned in the path of said energy beam are successively illuminated by said energy beam, energy receiving means mounted to said support for receiving energy reflected from said surface and for generating an electrical signal that varies in amplitude and frequency in accordance with roughness of said surface, and means responsive to said energy receiving means for generating amplitude and frequency signals defining both amplitude and frequency of energy reflected from said illuminated areas.

9. The apparatus of claim 8 including means responsive to said amplitude and frequency signals for providing an indication of roughness of said surface.

10. The apparatus of claim 8 including means for combining said amplitude and frequency signals to provide an output indicative of roughness of said surface.

11. The apparatus of claim 8 wherein said means for generating amplitude and frequency signals comprises amplitude circuit means responsive to said energy receiving means for generating an RMS amplitude signal, frequency circuit means responsive to said energy receiving means for generating a frequency signal, and processing means for combining said amplitude and frequency signals in a predetermined ratio to provide an output indicative of surface roughness.

12. A method of inspection of the surface of a part comprising:

providing a housing having a bottom adapted to be placed adjacent a surface of which roughness is to be inspected, projecting a light beam from said housing to said part in a circular scan pattern of parallel beam paths, receiving light of varying intensity reflected from the surface into said housing and generating from said received light a first electrical signal having an amplitude and frequency indicative of the intensity and frequency of intensity variations of said reflected light, and providing an output signal indicating amplitude and frequency of said first electrical signal to thereby provide an indication of roughness of said surface.

13. The method of claim 12 wherein said step of providing an output signal comprises generating an amplitude signal having a magnitude representing the RMS amplitude of said first electrical signal, generating a frequency signal having a magnitude representing the frequency of said first electrical signal and combining said amplitude and frequency signals to provide said output signal.

14. The method of claim 12 including the step of calibrating said output to provide an output indicating roughness of said surface in a known scale of roughness.

15. The method of claim 12 wherein said step of calibrating comprises providing a plurality of different calibration surfaces of predetermined mutually different roughnesses, inspecting the surface of one of said calibration surfaces and adjusting said output signal to provide an output signal value corresponding to the predetermined roughness of the inspected calibration surface, and repeating said two last mentioned steps for each of a plurality of said calibrating surfaces.

* * * * *